United States Patent
Kimura et al.

(10) Patent No.: US 8,668,612 B2
(45) Date of Patent: Mar. 11, 2014

(54) LUBRICATION STRUCTURE OF DIFFERENTIAL GEAR UNIT

(75) Inventors: Hiromichi Kimura, Okazaki (JP); Takeshi Kuwahara, Nisshin (JP); Takeshi Kitahata, Toyota (JP); Tatsuo Obata, Toyota (JP); Masahiro Tanae, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 358 days.

(21) Appl. No.: 13/074,422

(22) Filed: Mar. 29, 2011

(65) Prior Publication Data

US 2011/0263372 A1 Oct. 27, 2011

(30) Foreign Application Priority Data

Apr. 21, 2010 (JP) ................. 2010-097545

(51) Int. Cl.
*F16H 57/04* (2010.01)
*F16H 57/02* (2012.01)
*F16B 31/02* (2006.01)

(52) U.S. Cl.
USPC .............. 475/160; 475/159; 411/8; 184/6.12; 74/606 R

(58) Field of Classification Search
USPC .................................. 475/159, 160
See application file for complete search history.

(56) References Cited

U.S. PATENT DOCUMENTS

| 5,669,844 A | 9/1997 | Homan et al. |
| 2009/0215568 A1 * | 8/2009 | Shibukawa ................... 475/159 |

FOREIGN PATENT DOCUMENTS

| JP | A-5-106710 | 4/1993 |
| JP | U-5-52434 | 7/1993 |
| JP | U-5-72626 | 10/1993 |
| JP | A-11-229960 | 8/1999 |
| JP | 2006342890 | * 12/2006 |
| JP | A-2009-180289 | 8/2009 |

* cited by examiner

*Primary Examiner* — David D Le
*Assistant Examiner* — Colby M Hansen
(74) *Attorney, Agent, or Firm* — Oliff PLC

(57) ABSTRACT

In a lubrication structure of a differential gear unit, a case has a guide rib that extends over a certain area with respect to a rotation path of a head of a bolt when a ring gear rotates, and that protrudes out from the case toward the head of the bolt. Also, a through-hole that extends in a vertical direction is formed in an upper portion of a hollow supporting portion, and the guide rib has an oil reservoir that curves toward an upper end opening of the through-hole.

5 Claims, 5 Drawing Sheets

LUBRICATION STRUCTURE OF DIFFERENTIAL GEAR UNIT

INCORPORATION BY REFERENCE

The disclosure of Japanese Patent Application No. 2010-097545 filed on Apr. 21, 2010 including the specification, drawings and abstract is incorporated herein by reference in its entirety.

BACKGROUND OF THE INVENTION

1. Field of the Invention

The invention relates to a lubrication structure of a differential gear unit. More particularly, the invention relates to a lubrication structure of a differential gear unit that lubricates a bearing that rotatably supports a differential case that houses a differential mechanism therein by a hollow supporting portion of a case of a power transmitting apparatus.

2. Description of the Related Art

A differential gear unit incorporated in a transaxle of a vehicle such as an automobile includes a housing portion and a differential case that is rotatably housed in the housing portion. A drive pinion that is driven by a propeller shaft or the like is rotatably housed in the housing portion, and a ring gear that is in mesh with this drive pinion is mounted to the differential case by a plurality of bolts.

This differential case is rotatably supported via a tapered roller bearing in a case of a power transmitting apparatus. This tapered roller bearing receives a load not only in the radial direction but also in the thrust (i.e., axial) direction, so it is critical that it be kept well lubricated.

Normally, oil for lubricating the drive pinion and the ring gear is stored in the housing portion. In order to lubricate the tapered roller bearing with this oil, the oil level is raised so that the tapered roller bearing is immersed in oil (see Japanese Patent Application Publication No. 5-106710 (JP-A-5-106710), for example).

Meanwhile, the bolts used to fasten the ring gear to the differential case are susceptible to fluctuating loads and vibration, so folded washers or the like are used. In particular, the bolts that fasten the ring gear to the differential case are attached in a circle centered around the rotational axis of the differential case and the ring gear. Accordingly, the amount of slippage that occurs between the heads of the bolts and the seating surface becomes greater farther radially outward. If the slippage that occurs between the heads of these bolts and the seating surface is in the same direction as the rotational direction in which the bolts loosen, the clamping force of the bolts may gradually decrease.

One known example of technology for maintaining the clamping force of bolts includes hexagon bolts, a flange portion of a differential case through which shafts of the hexagon bolts pass and with which heads of the hexagon bolts engage, and a ring gear that is fastened to the flange portion of the differential case by the hexagon bolts. Recessed portions that recess the heads of the hexagon bolts are formed in the flange portion of the differential case, and resin is filled between the recessed portions and the heads of the hexagon bolts that are recessed in the recessed portions. This resin is able to inhibit the clamping force of the hexagon bolts from gradually decreasing (see Japanese Patent Application Publication No. 2009-480289 (JP-A-2009-180289), for example).

However, with the lubrication structure of a differential gear unit described in JP-A-5-106710, in order to lubricate the tapered roller bearing with the oil filled in the housing portion, the oil level must be raised to immerse the tapered roller bearing in oil. Thus, the amount of oil in the housing portion ends up increasing, which in turn increases the rotational resistance of the differential gear unit as well as reduces the power transmission efficiency.

Also, with the technology described in JP-A-2009-180289, the recessed portions that recess the heads of the hexagon bolts are formed in the flange portion of the differential case, and resin is filled between these recessed portions and the heads of the hexagon bolts that are recessed in these recessed portions. As a result, the manufacturing cost of the differential gear unit ends up increasing. In particular, a recessed portion and filling resin must be provided for each hexagon bolt, so the manufacturing cost of the differential gear unit ends up increasing as the number of hexagon bolts increases.

SUMMARY OF THE INVENTION

In view of the problems of the related art described above, this invention provides a lubrication structure of a differential gear unit in which a guide rib that maintains the clamping force of a bolt is also able to serve as a guide rib for lubricating a bearing, which enables an increase in rotational resistance of the differential gear unit, as well as an increase in the manufacturing cost of the differential gear unit, to be suppressed.

A first aspect of the invention relates to a lubrication structure of a differential gear unit that i) includes a differential case that houses a differential gear unit therein and is rotatably supported via a bearing by a hollow supporting portion of a case of a power transmitting apparatus, and a ring gear that is fixed by a bolt to the differential case, and that ii) lubricates the bearing with hydraulic fluid. In this lubrication structure, a through-hole that extends in a vertical direction is formed in an upper portion of the hollow supporting portion. Also, a guide rib that extends over a certain area with respect to a rotation path of a head of the bolt when the ring gear rotates, and that protrudes out from the case toward the head of the bolt is provided on the case. Further, the guide rib has a guide portion positioned above the through-hole with respect to the rotation path of the head of the bolt.

According to this lubrication structure of a differential gear unit described above, the case has the guide rib that extends over a certain area with respect to the rotation path of the head of the bolt when the ring gear rotates, and that protrudes out from the case toward the head of the bolt. As a result, if the clamping force of the bolt gradually loosens, the head of the bolt will contact the guide rib. Thus, the clamping force of the bolt can be maintained.

Also, contact by the head of the bolt against the guide rib produces an abnormal noise. As a result, the driver is able to sense an abnormal change early on, and is thus prompted to take action.

Further, the through-hole that extends in the vertical direction is provided in an upper portion of the hollow supporting portion, and the guide rib has the guide portion positioned above the through-hole with respect to the rotation path of the head of the bolt. As a result, oil that drips from above the case down onto the differential gear unit can be led from the guide portion to the bearing through the through-hole, such that the bearing can be lubricated.

Thus, the guide rib that maintains the clamping force of the bolt is also able to serve as a guide rib for lubricating the bearing. Hence, there is no need to raise the oil level to immerse the tapered roller bearing in oil, as there is with the related art. As a result, it is possible to suppress an increase in the rotational resistance of the differential gear unit, as well as suppress an increase in the manufacturing cost of the differential gear unit.

Here, in the lubrication structure of a differential gear unit described above, the guide rib may extend for a length of 80° to 100° inclusive in a direction of forward rotation from above an upper end opening of the through-hole of the hollow supporting portion. Having the guide rib extend for a length of 90° at this time is preferable in terms of functionality.

According to the lubrication structure of a differential gear unit described above, the guide rib that extends from the case toward the head of the bolt for a length of 80° to 100° inclusive is provided, which simultaneously inhibits approximately one-quarter of all of the bolts that fasten the ring gear to the differential case along the entire circumference from loosening. As a result, all of the bolts can be inhibited from loosening by the ring gear and the differential case rotating. Also, oil that drips down onto the differential gear unit from above the case can be led from the guide portion to the bearing through the through-hole, so that the bearing can be lubricated.

Also, in the lubrication structure of a differential gear unit described above, the guide portion may have an oil reservoir that curves toward an upper end opening of the through-hole.

According to the lubrication structure of a differential gear unit described above, the guide portion has an oil reservoir that curves toward the upper end opening of the through-hole. Therefore, oil that has dripped down from above the differential gear unit can be collected in the oil reservoir, then introduced from the oil reservoir into the through-hole through the upper end opening of the through-hole, and supplied to the bearing through the through-hole. Accordingly, the bearing can be lubricated using the guide rib that maintains the clamping force of the bolt.

Also, in the lubrication structure of a differential gear unit described above, the guide portion may further include an auxiliary guide rib that extends upward from a portion of the guide rib positioned above the upper end opening of the through-hole, and that receives oil drawn up by the ring gear. Also, the auxiliary guide rib may be positioned on a downstream side, in a direction of forward rotation of the ring gear, of the upper end opening of the through-hole.

With this lubrication structure of a differential gear unit, the guide portion has the auxiliary guide rib that extends upward from a portion of the guide rib positioned above the upper end opening of the through-hole, and that receives oil drawn up by the ring gear, and this auxiliary guide rib is positioned on the downstream side, in the direction of forward rotation of the ring gear, of the upper end opening of the through-hole. Therefore, oil that strikes the auxiliary guide rib during forward rotation, i.e., the rotational direction that is normally used, runs down along the auxiliary guide rib and is thus able to be guided to the upper end opening of the through-hole. Accordingly, the oil can be supplied to the bearing through the through-hole, so the bearing can be lubricated using the guide rib that maintains the clamping force of the bolt.

Accordingly, the invention is able to provide a lubrication structure of a differential gear unit in which a guide rib that maintains the clamping force of a bolt is also able to serve as a guide rib for lubricating a bearing, which enables an increase in rotational resistance of the differential gear unit, as well as an increase in the manufacturing cost of the differential gear unit, to be suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, example embodiments of the lubrication structure of a differential gear unit according to the invention will be described with reference to the accompanying drawings. First, a first example embodiment will be described. FIGS. 1 to 5 are views of the first example embodiment of the lubrication structure of a differential gear unit according to the invention. Incidentally, in this example embodiment, the lubrication structure of a differential gear unit is described as being applied to a hybrid vehicle.

Figure 1:
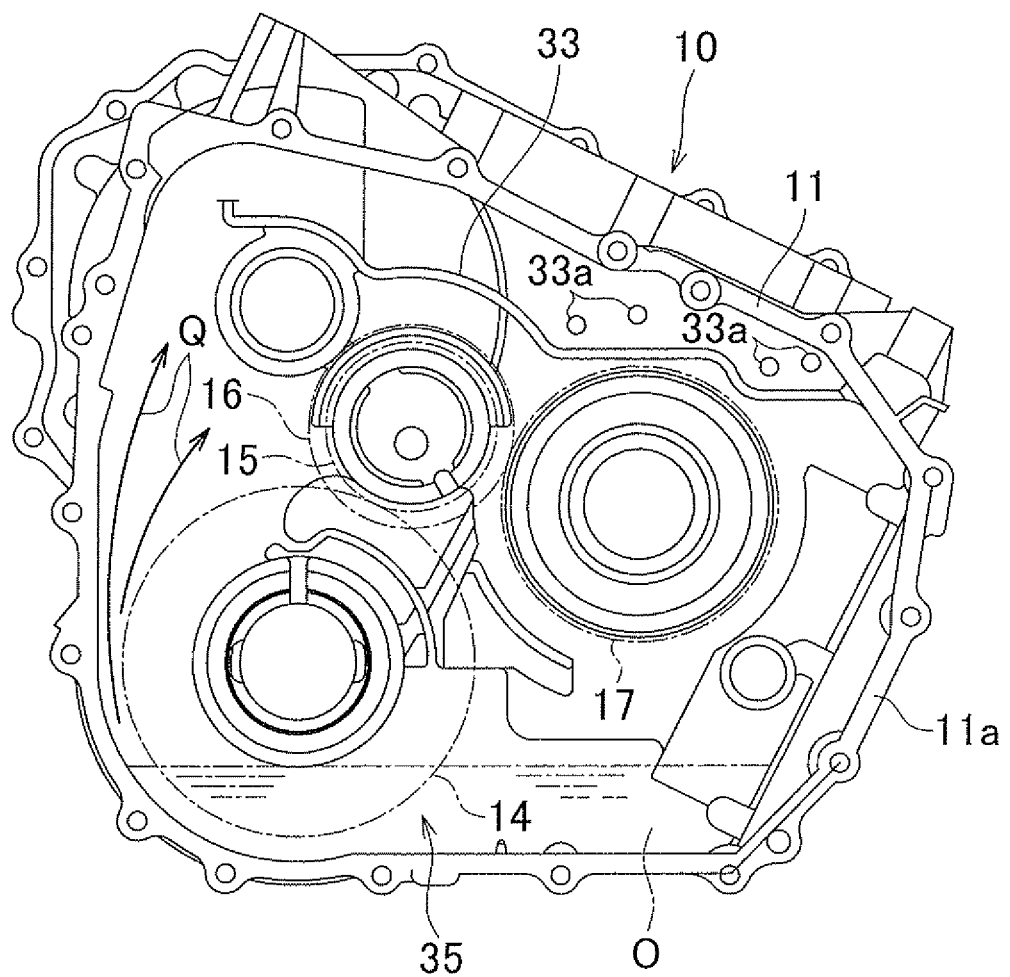
FIG. 1 is a view schematically showing a transaxle of a hybrid vehicle to which a lubrication structure of a differential gear unit according to a first example embodiment of the invention has been applied.

First the structure will be described. In FIG. 1, a power transmitting apparatus 10 includes a case 11, and this case 11 has an abutting surface 11a that contacts an abutting surface 12a of an opposing housing 12 (see FIG. 2).

In this power transmitting apparatus 10, a compound planetary gear set, not shown, that forms a speed change mechanism, a differential gear unit 13, to be described later, in which differential output to a drive shaft is possible, a drive motor, not shown, that drives the vehicle using stored electric power, and a motor-generator, not shown, that is capable of generating electric power using power from an engine, not shown, and the like are all housed in an internal space defined by the case 11 and the housing 12.

A final drive gear 15 that is in mesh with a ring gear 14 of the differential gear unit 13, and a counter driven gear 16 that is on the same axis as the final drive gear 15, are housed in the case 11 and the housing 12. The counter driven gear 16 is in mesh with a ring gear 17 of the compound planetary gear set.

Therefore, output from an engine or a drive motor is transmitted to the ring gear 14 of the differential gear unit 13 via the ring gear 17 of the compound planetary gear set, the counter driven gear 16, and the final drive gear 15, as is well known.

Figure 2:
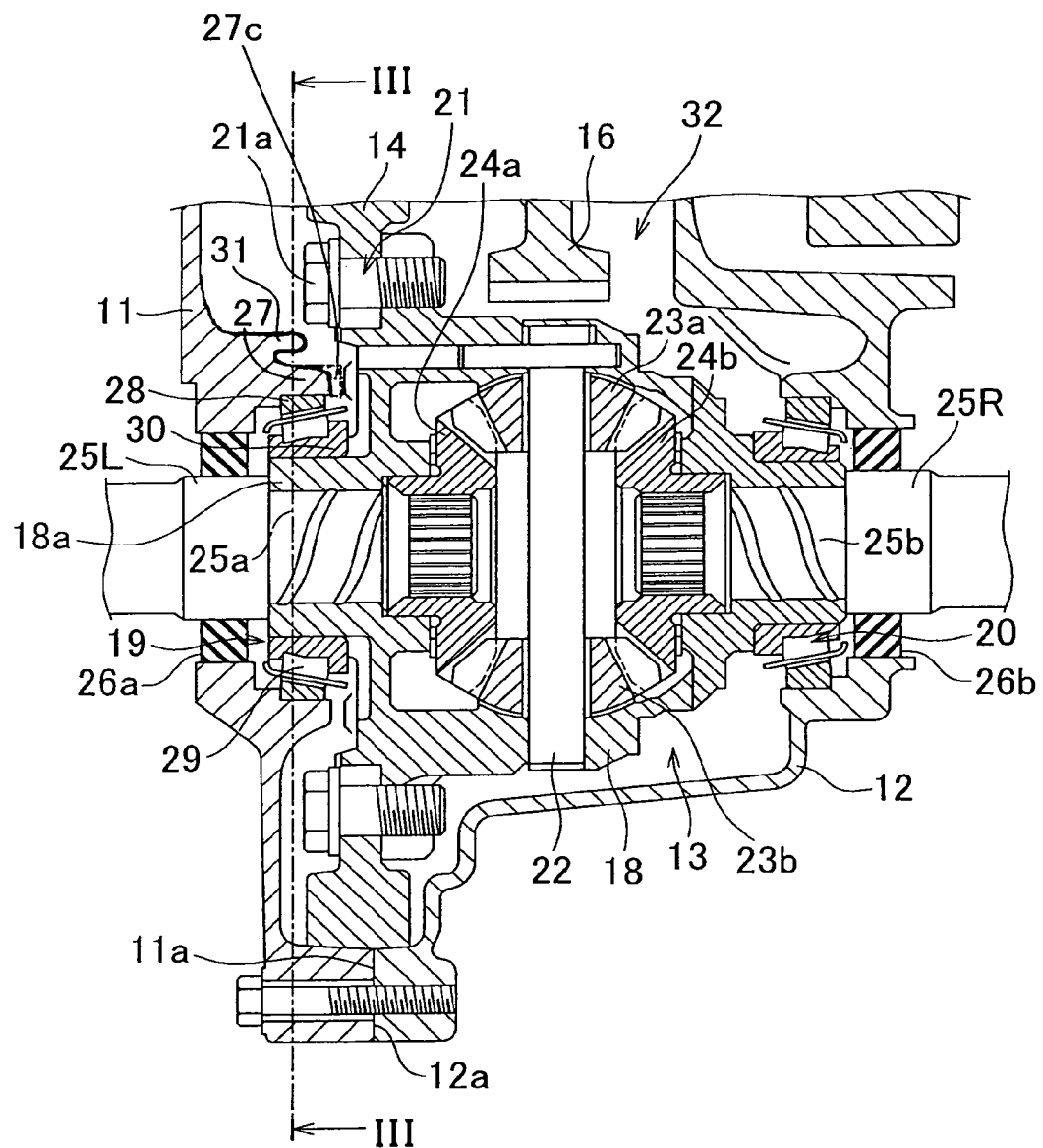
FIG. 2 is a sectional view schematically showing the main portions of the transaxle.

As shown in FIG. 2, the differential gear unit 13 includes a hollow differential case 18. This differential case 18 is rotatably supported by the case 11 and the housing 12 via tapered roller bearings 19 and 20.

Figure 3:
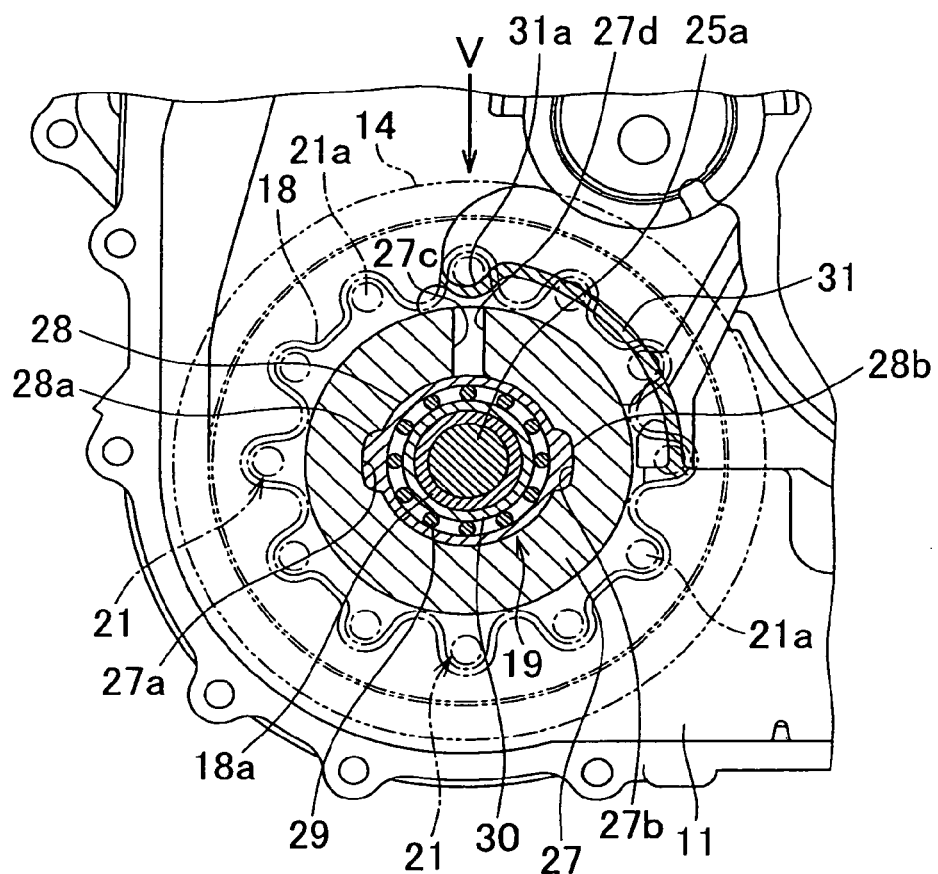
FIG. 3 is a sectional view taken along line III - III in FIG. 2.

The ring gear 14 that is in mesh with the final drive gear 15 (see FIG. 1) is fastened by a plurality of bolts 21 to an outer peripheral portion of the differential case 18, such that power output from the ring gear 17 of the compound planetary gear set is transmitted to the differential case 18 via the final drive gear 15. These bolts 21 are arranged predetermined intervals apart from one another in the circumferential direction of the ring gear 14, as shown in FIG. 3. The ring gear 14 is fastened to the differential case 18 by these bolts 21.

Also, as shown in FIG. 2, a pinion shaft 22 is rotatably supported inside the differential case 18, and a pair of differential pinions 23a and 23b is rotatably connected to the pinion shaft 22.

Side gears 24a and 24b are in mesh with both of the differential pinions 23a and 23b. A gear shaft 25a of a drive shaft 25L is connected to the side gear 24a, and a gear shaft 25b of a drive shaft 25R is connected to the side gear 24b. A driving wheel, not shown, is fixed to each of the drive shafts 25L and 25R.

Also, the drive shafts 25L and 25R are rotatably supported in the case 11 and housing 12 by seal members 26a and 26b, respectively. When the ring gear 14 of this differential gear unit 13 rotates, the differential case 18 rotates together with the ring gear 17. At this time, the pinion shaft 22 rotates together with the differential case 18, and the differential pinions 23a and 23b revolve around the axis of the differential case 18.

Then, the side gears 24a and 24b that are in mesh with the differential pinions 23a and 23b rotate. As a result, the driving wheels rotate via the drive shafts 25L and 25R.

Also, when the vehicle turns, for example, when the vehicle turns right in the forward direction, the left driving wheel rotates faster than the right driving wheel, so a rotational difference occurs between the left driving wheel and the right driving wheel. At this time, the rotational difference between the left driving wheel and the right driving wheel is permitted by the rotation of both the differential pinions 23a and 23b and the differential case 18, which enables the left and right wheels to rotate at different speeds. Incidentally, in this example embodiment, the pinion shaft 22, the differential pinions 23a and 23b, and the side gears 24a and 24b together form a differential mechanism.

Figure 4:
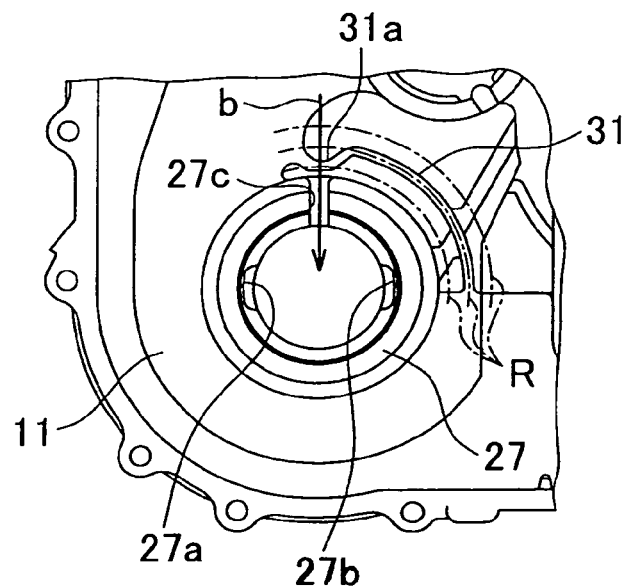
FIG. 4 is a front view of a main portion of a case.

Meanwhile, as shown in FIGS. 3 and 4, a hollow supporting portion 27 that rotatably supports one boss 18a of the differential case 18 in the axial direction via a tapered roller bearing 19 is formed in the case 11, and a notch 27a and 27b is formed on both sides of this hollow supporting portion 27 (see FIG. 3).

One of the tapered roller bearings 19 is fitted in this hollow supporting portion 27. This tapered roller bearing 19 is formed of an outer race 28 that fits on an inner peripheral portion of the hollow supporting portion 27, and an inner race 30 that is rotatably connected to the outer race 28 via tapered rollers 29.

Also, engaging convex portions 28a and 28b that engage with the notches 27a and 27b are provided on an outer peripheral portion of the outer race 28, such that the outer race 28 is attached to the hollow supporting portion 27 in a non-rotatable manner.

A tapered surface that is inclined with respect to the rotational axis of the differential case 18 is formed on an inner peripheral surface of the inner race 30. A tapered surface corresponding to the tapered surface of the inner race 30 is also formed on an outer peripheral surface of the outer race 28.

Also, each of the tapered rollers 29 is formed in a truncated cone shape, and a plurality of them is arranged between the outer race 28 and the inner race 30.

These tapered rollers 29 roll smoothly while being guided by an inner peripheral raceway surface of a tapered portion of the outer race 28 and an outer peripheral raceway surface of a tapered portion of the inner race 30. In this way, the tapered rollers 29 roll while being sandwiched between the raceway surfaces of the tapered portions of the outer race 28 and the inner race 30, so the tapered roller bearing 19 receives a load in both the radial direction and the thrust (i.e., axial) direction.

Also, a through-hole 27c of the hollow supporting portion 27 is formed in an upper portion of the hollow supporting portion 27. This through-hole 27c is formed extending in the vertical direction in the hollow supporting portion 27. Moreover, a guide rib 31 is provided on the case 11. This guide rib 31 extends over a certain area with respect to a rotation path R (see FIG. 4) of the heads 21a of the bolts 21 when the ring gear 14 rotates, and protrudes out from the case 11 toward the heads 21a of the bolts 21.

Figure 5:
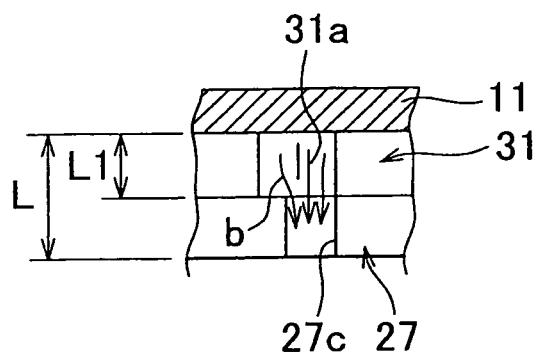
FIG. 5 is an arrow view of a guide rib and a hollow supporting portion in the direction of arrow V in FIG. 3.

As shown in FIG. 5, this hollow supporting portion 27 protrudes out from the case 11 by a length L, and the guide rib 31 protrudes out from the case 11 above the hollow supporting portion 27 by a length L1 that is shorter than the length L from the case 11.

When the ring gear 14 is fastened to the differential case 18 by the bolts 21, the guide rib 31 faces the heads 21a of the bolts 21 across a fixed gap. Thus, if the clamping force of the bolts 21 has gradually decreased, the heads 21a of the bolts 21 will contact the guide rib 31, so the clamping force of the bolts 21 is able to be maintained.

Therefore, the distance between the guide rib 31 and the heads 21a of the bolts 21 when the bolts 21 are fastening the ring gear 14 to the differential case 18 is preferably a distance at which the heads 21a of the bolts 21 contact the guide rib 31 when the clamping force of the bolts 21 has gradually decreased, but do not contact the guide rib 31 when the differential gear unit 13 is operating, i.e., when the ring gear 14 is rotating.

Also, the guide rib 31 extends for a length of approximately 80° to 100°, and more preferably approximately 90°, in the direction of forward rotation from above an upper end opening 27d of the through-hole 27c of the hollow supporting portion 27 (the guide rib 31 is shown by hatching in FIG. 3). The guide rib 31 has an oil reservoir 31a that is a guide portion that curves toward an upper end opening 27d of the through-hole 27c above the through-hole 27c with respect to the rotation path R. Having the guide rib 31 extend from the case 11 for a length of 80° to 100° toward the heads 21a of the bolts 21 simultaneously inhibits approximately one-quarter of all of the bolts 21 that fasten the ring gear 14 to the differential case 18 along the entire circumference from loosening. As a result, all of the bolts 21 can be inhibited from loosening by the ring gear 14 and the differential case 18 rotating together. Having the angle be 90° at this time is preferable in terms of functionality. Also, because the guide rib 31 extends in the direction of forward rotation, i.e., the rotational direction that is normally used, oil that drips down onto the differential gear unit from above the case 11 can be led from the oil reservoir 31a to the tapered roller bearing 19 through the through-hole 27c, so that the tapered roller bearing 19 can be lubricated.

Oil that drips down from above the case 11 onto the differential gear unit 13 collects in this oil reservoir 31a, and the oil collected in the oil reservoir 31a is led to the through-hole 27c.

In this example embodiment, as shown in FIG. 1, oil O accumulates in a bottom portion 35 of the housing portion 32 of the differential gear unit 13 defined by the case 11 and the housing 12, as shown in FIG. 2. Also, a catch tank 33 is provided in an upper portion of the case 11. Therefore, some of the oil that has accumulated in the bottom portion 35 of the housing portion 32 is drawn up by the ring gear 14 and added to the catch tank 33.

By adding oil that has accumulated in the bottom portion 35 of the housing portion 32 to the catch tank 33, the catch tank 33 acts to inhibit the amount of oil that accumulates in the housing portion 32 from increasing, thereby suppressing the rotational resistance of the ring gear 14 and the differential case 18, i.e., of the differential gear unit 13, from increasing.

Also, the oil that has been added to the 33 is supplied to the drive motor and the motor-generator via oil supply holes 33a and used to cool the drive motor and the motor-generator.

Next, the operation will be described. In this example embodiment, the guide rib 31 that extends over a certain area with respect to the rotation path R of the heads 21a of the bolts 21 when the ring gear 14 rotates, and that protrudes out from the case 11 toward the heads 21a of the bolts 21, is formed on the case 11.

Therefore, if the clamping force of the bolts 21 has gradually decreased while the differential gear unit 13 is operating, the heads 21a of the bolts 21 will contact the guide rib 31, such that the clamping force of the bolts 21 can be maintained. Also, contact by the heads 21a of the bolts 21 against the guide rib 31 produces an abnormal noise. As a result, the driver is able to sense an abnormal change early on, and is thus prompted to take action.

Meanwhile, when the differential gear unit 13 is operating, oil accumulated in the bottom portion 35 of the housing portion 32 is drawn up by the ring gear 14, as shown by arrows Q in FIG. 1. As a result, some of this oil is added to the catch tank 33, and some is supplied to the meshing portion of the ring gear 14 and the final drive gear 15, as well as to the meshing portion of the final drive gear 15 and the counter driven gear 16, such that the ring gear 14, the final drive gear 15, and the counter driven gear 16 are lubricated. Also, some of the oil drawn up by the ring gear 14 drips down from above the differential gear unit 13.

In this example embodiment, the through-hole 27c that extends vertically is formed in the upper portion of the hollow supporting portion 27, and the guide rib 31 has the oil reservoir 31a that curves toward the upper end opening 27d of the through-hole 27c. As a result, the oil that has dripped down from above the differential gear unit 13 is able to collect in the oil reservoir 31a.

Then, the oil that has collected in the oil reservoir 31a is introduced into the through-hole 27c through the upper end opening 27d of the through-hole 27c, and supplied to one of the tapered roller bearings 19 through the through-hole 27c, as shown by arrow b in FIGS. 4 and 5.

The oil supplied to this tapered roller bearing 19 is supplied to the sliding surfaces of the outer race 28 and the tapered rollers 29 and the sliding surfaces of the inner race 30 and the tapered rollers 29, so the tapered roller bearing 19 is able to be lubricated using the guide rib 31.

As a result, the guide rib 31 that maintains the clamping force of the bolts 21 is also able to serve as the guide rib 31 for lubricating the tapered roller bearing 19. Therefore, there is no need to raise the oil level to immerse the tapered roller bearing 19 in oil, as there is with the related art. Thus, it is possible to suppress an increase in the rotational resistance of the differential gear unit 13, as well as suppress an increase in the manufacturing cost of the differential gear unit 13.

Figure 6:
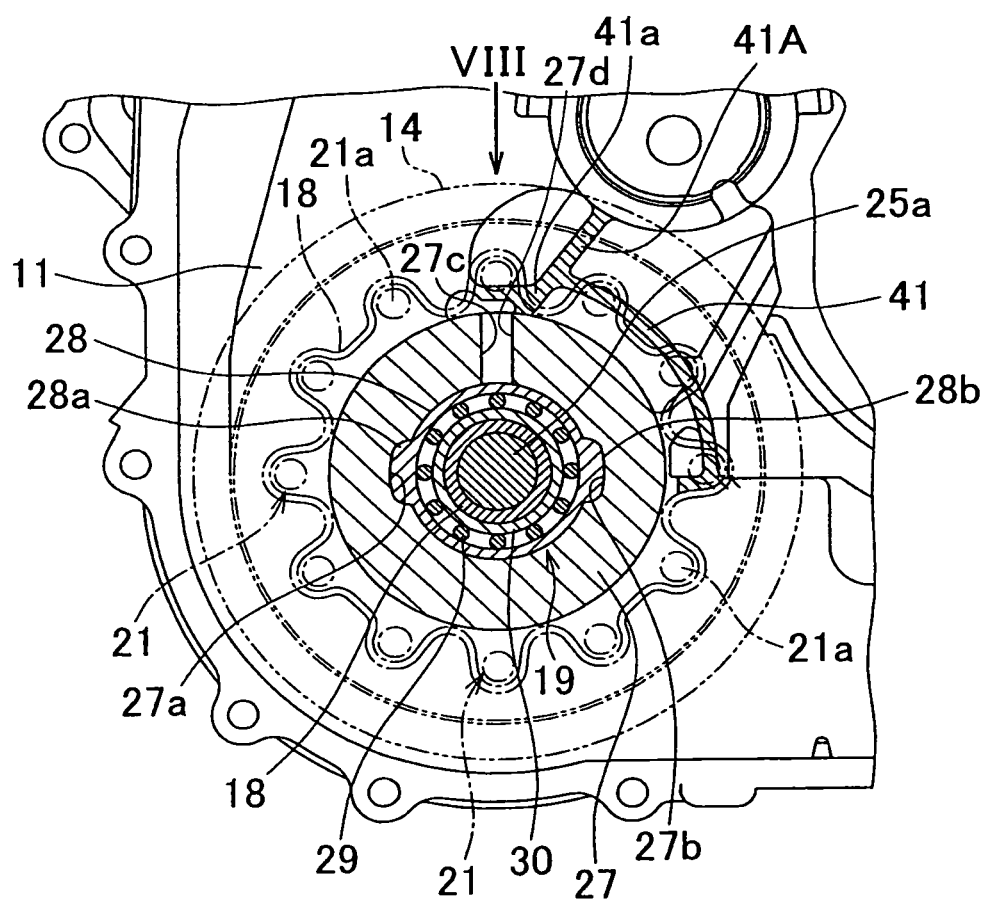
FIG. 6 is a sectional view corresponding to the view taken along line VI -VI in FIG. 2, of a transaxle to which a lubrication structure of a differential gear unit according to a second example embodiment of the invention has been applied.
Figure 7:
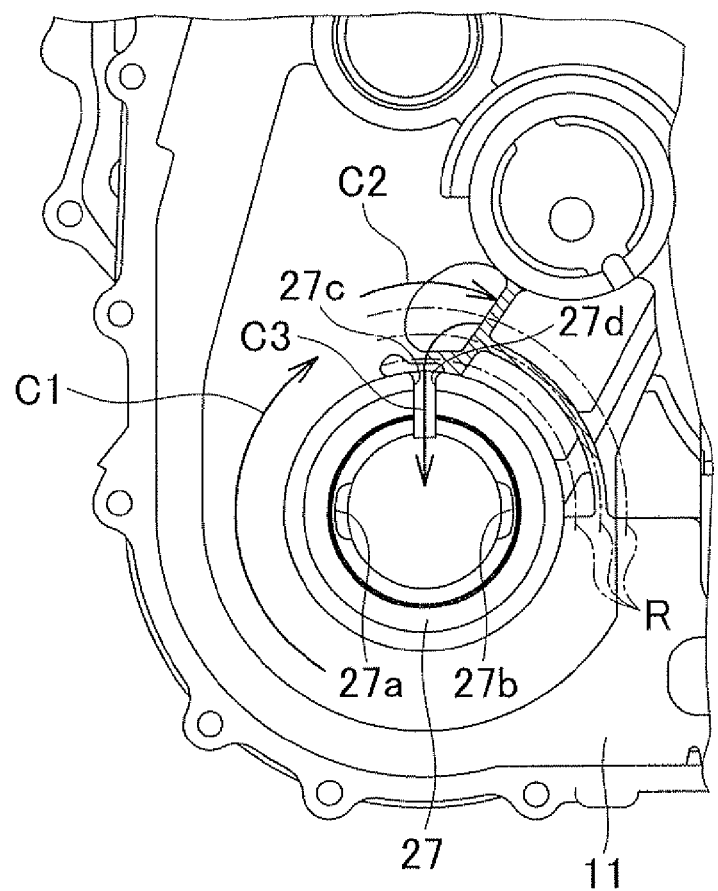
FIG. 7 is a front view of a main portion of a case.
Figure 8:
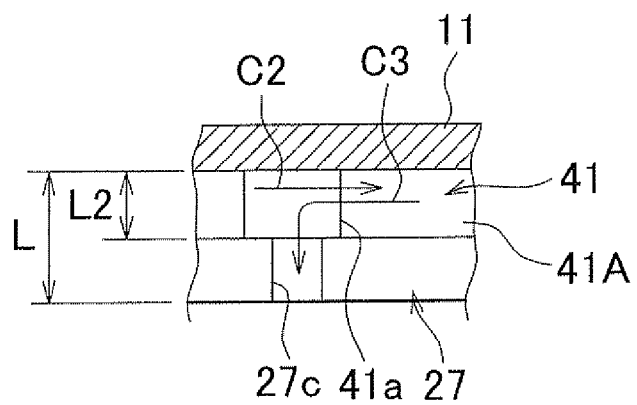
FIG. 8 is an arrow view of a guide rib and a hollow supporting portion in the direction of arrow VIII in FIG. 6.

Next, a second example embodiment of the invention will be described. FIGS. 6 to 8 are views of the second example embodiment of the lubrication structure of a differential gear unit according to the invention. Structure in this second example embodiment that is the same as structure in the first example embodiment will be denoted by like reference characters and descriptions of that structure will be omitted.

In FIGS. 6 and 7, a guide rib 41 (indicated by hatching) that maintains the clamping force of the bolts 21 is provided on the case 11. This guide rib 41 extends over a certain area with respect to the rotation path R of the heads 21a of the bolts 21 when the ring gear 14 rotates, and protrudes out from the case 11 toward the heads 21a of the bolts 21.

Also, as shown in FIG. 8, the hollow supporting portion 27 protrudes out from the case 11 by a length L, and the guide rib 41 protrudes out from the case 11 above the hollow supporting portion 27 by a length L2 that is shorter than the length L from the case 11.

When the ring gear 14 is fastened to the differential case 18 by the bolts 21, the guide rib 41 faces the heads 21a of the bolts 21 across a fixed gap. Thus, if the clamping force of the bolts 21 has gradually decreased, the heads 21a of the bolts 21 will contact the guide rib 41, so the clamping force of the bolts 21 is able to be maintained.

Also, the guide rib 41 includes an auxiliary guide rib 41A that extends upward from a portion 41a of the guide rib 41 positioned above the upper end opening 27d of the through-hole 27c, and that serves as a guide portion that receives oil drawn up by the ring gear 14. This auxiliary guide rib 41A is positioned on the downstream side, in the direction of formed rotation of the ring gear 14, of the upper end opening 27d of the through-hole 27c. Incidentally, in this example embodiment, the auxiliary guide rib 41A forms a guide portion.

Next, the operation will be described. In this example embodiment, the case 11 has the guide rib 41 that extends over a certain area with respect to the rotation path R of the heads 21a of the bolts 21 when the ring gear 14 rotates, and that protrudes out from the case 11 toward the heads 21a of the bolts 21.

Therefore, if the clamping force of the bolts 21 has gradually decreased while the differential gear unit 13 is operating, the heads 21a of the bolts 21 will contact the guide rib 41, so the clamping force of the bolts 21 is able to be maintained. Also, contact by the heads 21a of the bolts 21 against the guide rib 41 produces an abnormal noise. As a result, the driver is able to sense an abnormal change early on, and is thus prompted to take action.

Meanwhile, when the differential gear unit 13 is operating, oil accumulated in the bottom portion 35 of the housing portion 32 is drawn up by the ring gear 14. Most of this oil O is added to the catch tank 33, but some of it is drawn up to the downstream side in the rotational direction of the ring gear 14.

In this example embodiment, the guide rib 41 has the auxiliary guide rib 41A that extends upward from the portion 41a of the guide rib 41 positioned above the upper end opening 27d of the through-hole 27c, and that receives oil drawn up by the ring gear 14. This auxiliary guide rib 41A is positioned on the downstream side, in the direction in which the ring gear 14 rotates, of the upper end opening 27d of the through-hole 27c. Therefore, as shown in FIGS. 7 and 8, after the oil that has been drawn up by the ring gear 14 as indicated by arrow C1 strikes the auxiliary guide rib 41A as indicated by arrow C2, this oil runs down along the auxiliary guide rib 41A and is thus able to be guided to the upper end opening 27d of the through-hole 27c, as indicated by arrow C3.

Therefore, oil is able to be supplied to the tapered roller bearing 19 through the through-hole 27c, so the tapered roller bearing 19 can be lubricated using the guide rib 41 that maintains the clamping force of the bolts 21.

As a result, the guide rib 41 that maintains the clamping force of the bolts 21 is also able to serve as the guide rib 41 for lubricating the tapered roller bearing 19. Therefore, there is no need to raise the oil level to immerse the tapered roller bearing 19 in oil, as there is with the related art. Thus, it is possible to suppress an increase in the rotational resistance of the differential gear unit 13, as well as suppress an increase in the manufacturing cost of the differential gear unit 13.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

As described above, the lubrication structure of a differential gear unit according to the invention is advantageous in that the guide rib that maintains the clamping force of the bolts can also be used as a guide rib for lubricating a bearing, As a result, an increase in rotational resistance of the differential gear unit and an increase in the manufacturing cost of the differential gear unit can be suppressed. Thus, the invention is effective as a lubrication structure of a differential gear unit that cools a stator coil by supplying coolant to the stator coil from above.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A lubrication structure of a differential gear unit that i) includes a differential case that houses a differential gear unit therein and is rotatably supported via a bearing by a hollow supporting portion of a case of a power transmitting apparatus, and a ring gear that is fixed by a bolt to the differential case, and that ii) lubricates the bearing with hydraulic fluid, comprising:

a through-hole that is provided in an upper portion of the hollow supporting portion and extends in a vertical direction; and a guide rib that axially extends over a certain area with respect to a rotation path of a head of the bolt when the ring gear rotates, and that protrudes out from the case toward the head of the bolt such that contact between the guide rib and the bolt head maintains a clamping force of the bolt, wherein the guide rib has a guide portion positioned above the through-hole with respect to the rotation path of the head of the bolt for guiding lubricant to the through hole.

2. The lubrication structure according to claim 1, wherein the guide rib extends for a length of 80° to 100° inclusive in a direction of forward rotation from above an upper end opening of the through-hole of the hollow supporting portion.

3. The lubrication structure according to claim 1, wherein the guide portion has an oil reservoir that curves toward an upper end opening of the through-hole.

4. The lubrication structure according to claim 3, wherein the guide portion further includes an auxiliary guide rib that extends upward from a portion of the guide rib positioned above the upper end opening of the through-hole, and that receives oil drawn up by the ring gear; and the auxiliary guide rib is positioned on a downstream side, in a direction of forward rotation of the ring gear, of the upper end opening of the through-hole.

5. The lubrication structure according to claim 1, wherein the guide portion further includes an auxiliary guide rib that extends upward from a portion of the guide rib positioned above the upper end opening of the through-hole, and that receives oil drawn up by the ring gear; and the auxiliary guide rib is positioned on a downstream side, in a direction of forward rotation of the ring gear, of the upper end opening of the through-hole.

* * * * *